United States Patent [19]

Adams et al.

[11] 3,852,958

[45] Dec. 10, 1974

[54] STALL PROTECTOR SYSTEM FOR A GAS TURBINE ENGINE

[75] Inventors: Max Martin Adams, Cincinnati, Ohio; Vernon Robert Duncan, Erlanger, Ky.

[73] Assignee: General Electric Company

[22] Filed: Sept. 28, 1973

[21] Appl. No.: 401,650

[52] U.S. Cl............ 60/39.28 R, 73/116, 340/27 SS
[51] Int. Cl........................... F02c 3/06, F02c 9/04
[58] Field of Search..... 60/39.28 R, 39.28 T, 39.29; 340/27 SS; 73/116

[56] References Cited
UNITED STATES PATENTS

| | | | |
|---|---|---|---|
| 3,080,712 | 3/1963 | Wood | 60/39.28 R |
| 3,540,214 | 11/1970 | Stirgwolt | 60/39.28 R |
| 3,809,490 | 5/1974 | Harner | 60/39.29 X |

Primary Examiner—Carlton R. Croyle
Assistant Examiner—Robert E. Garrett
Attorney, Agent, or Firm—Edward S. Roman

[57] ABSTRACT

A stall protector system is provided for a gas turbine engine wherein the compressor pressure is measured, differentiated, and compared with a reference indicative of the maximum rate at which the compressor pressure decreases during normal operation. When the actual rate of decrease of compressor pressure exceeds the reference rate, then the signal is integrated and compared with a second reference indicative of the minimum change in compressor pressure before a stall occurs. If the second reference is exceeded, the fuel flow to the combustor is automatically restricted.

10 Claims, 1 Drawing Figure

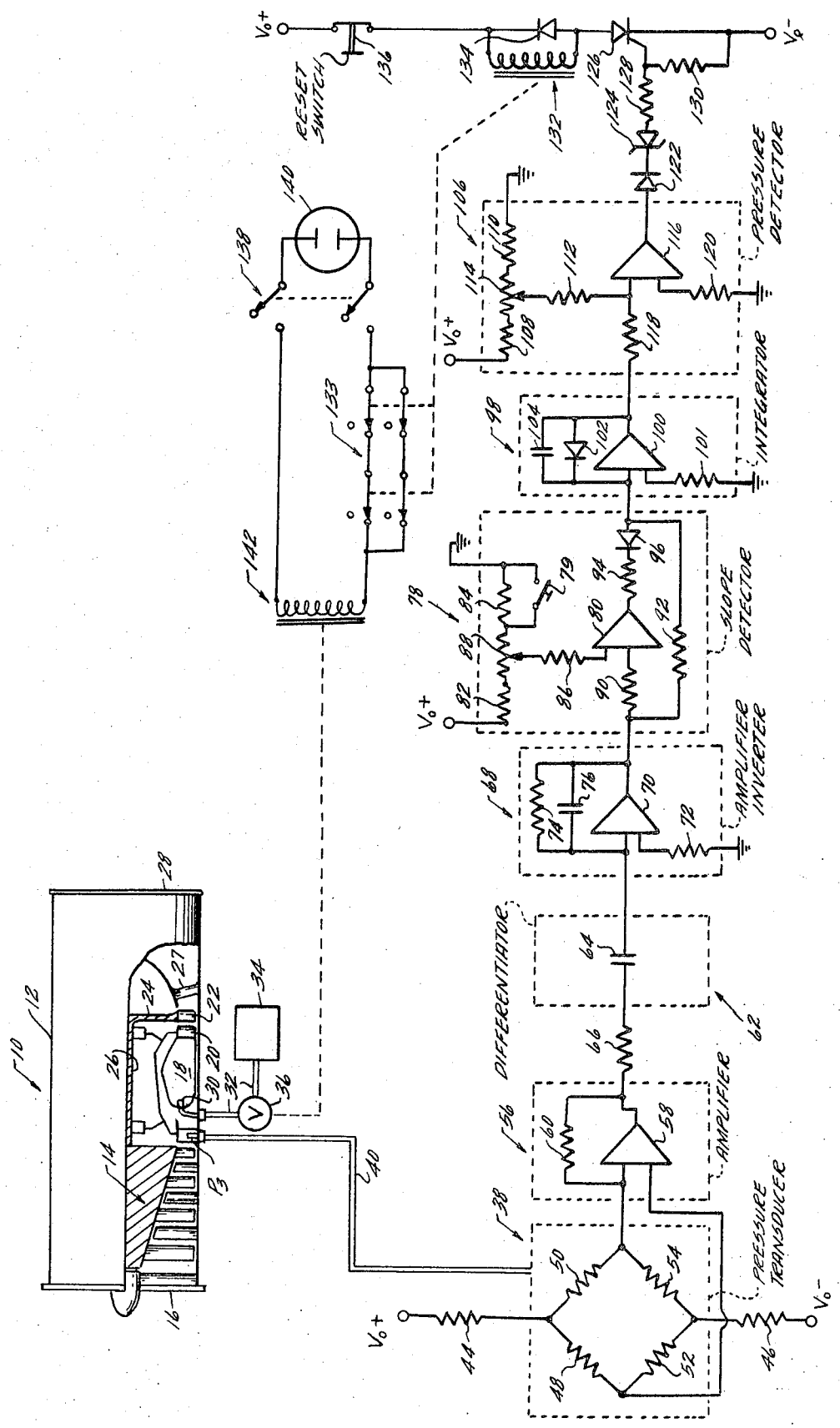

STALL PROTECTOR SYSTEM FOR A GAS TURBINE ENGINE

BACKGROUND OF THE INVENTION

This invention relates to a stall protector system for a gas turbine engine and, more particularly, to a stall protector system for a gas turbine engine which precludes the possibility of erroneous stall detection caused by rapid decelerations or fleeting transients in the compressor discharge pressure.

During operation of an aircraft gas turbine engine, there may occur a phenomenon known as compressor stall, wherein the pressure ratio or discharge pressure of the compressor initially exceeds some critical value at a particular speed, resulting in a subsequent reduction of compressor pressure ratio and airflow delivered to the engine combustor. Compressor stall may result from a variety of reasons, such as when the engine is accelerated too rapidly or when the inlet profile of air pressure or temperature becomes unduly distorted during normal operation of the engine. During supersonic flight, compressor stall may result from a condition commonly referred to as unstart which may be precipitated by the incursion of strong normal shock waves at the engine inlet, resulting in a drop in inlet pressure. Compressor damage due to the ingestion of foreign objects or a malfunction of a portion of the engine control system may also result in a compressor stall.

If such a condition is undetected and permitted to continue, the combustor temperatures and the vibratory stresses induced in the compressor may become sufficiently high to cause damage to the gas turbine engine. Compressor stall may be alleviated by reducing or entirely blocking the flow of fuel to the combustor.

The fact that air pressure at the discharge end of the gas turbine engine compressor rapidly decays during stall has led some to monitor the compressor discharge pressure as an indication of compressor stall. However, a rapid decay in the compressor discharge pressure may also occur when the engine is decelerated in which case an erroneous indication of compressor stall would occur. Furthermore, the low compressor pressure ratio commonly associated with very high altitude flight could also yield an erroneous indication of compressor stall. In addition, rapid pressure transients at the discharge end of the gas turbine compressor, although initially appearing to be a compressor stall, are of only momentary duration and, in fact, do not prove damaging to the operation of the gas turbine engine. A pending patent application, Ser. No. 354,303, assigned to the instant assignee, provides a stall warning system which can distinguish an actual compressor stall from a rapid deceleration or momentary transient by simultaneously monitoring both the compressor pressure and the turbine or exhaust temperature. However, it may not always be possible or desirable to monitor the turbine or exhaust temperature in conjunction with the compressor pressure.

Therefore, it is a primary object of this invention to provide a stall protector system for a gas turbine engine wherein the system can distinguish an actual compressor stall and then automatically provide corrective action to clear the stall.

It is another object of this invention to provide a stall protector system for a gas turbine engine wherein the system can distinguish an actual compressor stall from a rapid decay in compressor pressure associated with a deceleration of the engine or a momentary transient.

It is a further object of this invention to provide a stall protector system for a gas turbine engine wherein the system can distinguish an actual compressor stall without simultaneously monitoring turbine or exhaust gas temperature.

SUMMARY OF THE INVENTION

These and other objects and advantages will become clearly understood from the following detailed description and drawings, all of which are intended to be representative of, rather than in any way limiting on, the scope of invention. A stall protector system is provided for a gas turbine engine of the type having a compressor, combustor, turbine and exhaust duct in serial flow relation. The system includes means for measuring the compressor pressure and providing an electrical output signal corresponding to the actual compressor pressure measured. A differentiator receives and differentiates the output signal from the measuring means, thus providing an output signal indicative of the rate of change of compressor pressure. A slope detector next compares the rate of change of compressor pressure with a reference rate signal indicative of the maximum rate at which the compressor pressure may be expected to decrease during deceleration. When the actual rate of decrease of compressor pressure exceeds the reference rate, an integrator provides a time integration of the compressor pressure rate. A pressure detector then compares the actual change in compressor pressure from the integrator with a second reference signal corresponding to the minimum change in compressor pressure indicative of a compressor stall. Means are provided for regulating the flow of fuel to the combustor when the actual change in compressor pressure exceeds the second reference signal.

BRIEF DESCRIPTION OF THE DRAWING

While the specification concludes with claims distinctly claiming and particularly pointing out the invention described herein, it is believed that the invention will be more readily understood by reference to the discussion below and the accompanying Drawing in which:

The Drawing is a schematic representation of the stall protector system of this invention as connected to a typical gas turbine engine.

DESCRIPTION OF THE PREFERRED EMBODIMENT

Referring to the Drawing, a gas turbine engine is shown at 10 as comprising a cylindrical housing 12 having a compressor 14, which may be of the axial flow type, journaled within the housing adjacent its forward end. The compressor 14 receives air through an annular air inlet 16 and delivers compressed air to a combustion chamber 18. Within the combustion chamber 18 fuel is burned with air and the resulting combustion gases are directed by a nozzle or guide vane structure 20 to the rotor blades 22 of a turbine rotor 24 for driving the rotor. A shaft 26 drivably connects the turbine rotor 24 with the compressor 14. From the turbine blades 22, the exhaust gases discharge rearwardly through an exhaust duct 27 into the surrounding atmosphere through an exhaust nozzle 28, whereby the gas turbine engine is provided with forward propulsive thrust. The gas turbine structure so far described is conventional.

Fuel is furnished to the combustion chamber 18 from a plurality of circumferentially spaced apart fuel nozzles 30 which receive an inlet flow of fuel from a main fuel control 34 through an inter-connecting conduit 32. The flow of fuel through the conduit 32 may be interrupted by a valve 36 which is controlled to operate in a manner to be more fully described in the following discussion.

The stall protector of this invention includes a pressure transducer 38 which may be of the strain gauge type connected to receive the compressor outlet airflow through a conduit 40, the inlet of which is suitably disposed at the discharge side of the compressor 14. The pressure transducer 38 includes four resistors 48, 50, 52 and 54, arranged in a bridge network and excited by positive and negative voltage supplies $V_o+$ and $V_o-$ through respective inter-connecting resistors 44 and 46. The output from the pressure transducer 38 is directed to an amplifier 56 which includes an operational amplifier 58, together with a feedback resistor 60 which is selected for proper gain so as to accommodate variations in different transducers. The output from the amplifier 56 is directed by way of a series resistor 66 to a differentiator 62 which comprises a capacitor 64. The signal from the differentiator 62 is then amplified and inverted by an amplifier and inverter circuit 68 comprising an operational amplifier 70, together with a feedback resistor 74 and a feedback capacitor 76 connected in parallel arrangement. One input to the operational amplifier 70 is connected to the zero baseline voltage through a series resistor 72. The zero baseline voltage is conventionally illustrated as ground voltage, although it will be immediately apparent that there can be no physical connection to ground on board an airborne gas turbine engine.

There is next included a slope detector circuit 78 having an operational amplifier 80, one input of which is serially connected to receive the output from the amplifier inverter 68 through a series resistor 90. The other input to the operational amplifier 80 is received through a series resistor 86 from a reference network having resistors 82, 84 and potentiometer 88 connected in series between the voltage supply $V_o+$ and the zero baseline voltage. There is also included a test switch 79, the use of which will become more apparent from the following discussion. The output of the operational amplifier 80 is directed through a series resistor 94 and a series diode 96, wherein the anode side of the diode is connected back to the input of the slope detector 78 through a parallel resistor 92.

The output from the slope detector 78 is directed to an integrator 98 which includes an operational amplifier 100 in parallel connection with a diode 102 and a capacitor 104. One input to the operational amplifier 100 is connected through a resistor 101 to the zero baseline voltage. The output signal from the integrator 98 is directed to a pressure detector 106 which includes an operational amplifier 116, together with a reference resistor network comprising resistors 108 and 110, together with a potentiometer 114 connected in series between the voltage supply $V_o+$ and the zero baseline voltage. The slider of the potentiometer 114 is connected to one input of the operational amplifier 116 through a series resistor 112 with a second series resistor 118 inter-connecting the output signal from the integrator 98 to the same input terminal of the operational amplifier 116. The other input terminal of the operational amplifier 116 is tied to the zero baseline voltage through a series resistor 120.

The output from the pressure detector 106 is directed through a diode 122, a zener diode 124, and a resistor 128, all of which are connected in series relation to the gate of a silicon controlled rectifier 126. The trigger of the silicon controlled rectifier 126 is also inter-connected to the minus voltage supply $V_o-$ through a parallel resistor 130. In series connection with the silicon controlled rectifier 126 and between the positive voltage supply $V_o+$ and negative voltage supply $V_o-$ there is provided a relay 132, together with a reset switch 136, the operation of which will become more obvious from the following discussion. There may also be provided a diode 134 in parallel connection with the coil of the relay 132.

The relay 132 includes a plurality of contacts 133 which are connected in parallel series redundant relation so as to be normally closed when the coil of the relay 132 is not energized. An AC power supply 140 is provided in series connection with the contacts 133 so as to actuate a solenoid 142 upon the closing of a power control switch 138. The solenoid 142 in turn controls the valve 36 so as to either open or shut off the flow of fuel to the fuel nozzles 30.

As previously discussed, the sudden acceleration of a gas turbine engine may result in a compressor stall wherein the compressor discharge pressure P3 may initially exceed some critical value, resulting in a subsequent drastic reduction of compressor discharge pressure and airflow delivered to the combustor. If such a condition is undetected and allowed to continue, the combustor temperatures and vibratory stresses induced in the compressor may become sufficiently high to cause damage to the gas turbine engine. The condition may be alleviated by temporarily cutting off the flow of fuel to the combustor until the stall condition has been rectified, at which time the flow of fuel to the combustor may be reinstated. The rapid decay in compressor discharge pressure P3 with compressor stall had led to the monitoring of compressor discharge pressure P3 or compressor pressure ratio P3/P2 as an indication of compressor stall. However, a rapid decay in the compressor discharge pressure P3 may also occur when the engine is suddenly decelerated and thus provide a false indication of compressor stall. In addition, there may be other momentary changes in the compressor discharge pressure P3 which exceed the normal rate of pressure change for a rapidly decelerated engine, but which do not have a lingering effect and therefore are not indicative of a stalled compressor. The stall protector system of this invention, however, specifically precludes such false indications of compressor stall by monitoring the change in compressor discharge pressure P3 whereupon the rate of decrease of compressor discharge pressure P3 is computed and compared with a reference signal indicative of the fastest rate of decrease which could be expected during normal deceleration of the engine. The rate of pressure decrease is then integrated and compared with a second reference indicative of the minimum change in compressor discharge pressure which must occur before the compressor can be said to have actually stalled. In this manner, rapid changes in compressor discharge pressure, which may exceed the normal rate of change for engine decelerations yet not have sufficient lingering effect to constitute an actual compressor stall, may be eliminated.

During engine operation, the pressure transducer 38 monitors the compressor discharge pressure and provides an electrical output signal, the value of which may be correlated to the actual compressor discharge pressure. The output signal from the pressure transducer 38 is then amplified by the amplifier 56 to a level which is determined by the resistor 60. The signal is thereafter differentiated by the differentiator 62 to provide the actual rate of change of compressor discharge pressure P3. The signal is next amplified and inverted by the circuit 68 wherein the resistor 74 and capacitor 76 operate in conjunction with the resistor 66 and capacitor 64 to provide a double lag break filter at approximately 190 radians thus eliminating any undesirable noise signals which may be generated by the differentiator 62.

The rate of compressor discharge pressure change is next compared with a reference voltage indicative of the maximum rate at which the compressor discharge pressure may be expected to decrease during normal deceleration of the gas turbine engine. If the rate of decrease of compressor discharge pressure is less than the reference rate, then the output signal from the slope detector 78 will assume a negative polarity. However, if the rate of decrease in compressor discharge pressure should exceed the reference rate, then the output signal from the slope detector 78 will switch to a positive polarity. While the output signal from the slope detector 78 is negative, indicating that the reference rate has not been exceeded, the output signal from the integrator 98 remains latched at approximately 0.5 volts through the diodes 102 and 96. When the output signal from the slope detector 78 changes to a positive polarity, indicating that the reference rate has been exceeded, the diode 96 operates to block the signal from the operational amplifier 80 and the output signal of the operational amplifier 100 integrates in a negative direction. The actual rate of integration is determined by the capacitor 104 and the resistor 92 together with the magnitude of the output signal from the amplifier inverter 68. The time integration of the compressor discharge pressure P3 rate signal represents the actual pressure drop occurring during the interval starting when the slope detector 78 is initially triggered to a positive polarity.

The pressure detector 106 determines the minimum change in the compressor discharge pressure P3 before the flow of fuel to the fuel nozzle 30 is interrupted by the valve 36. The reference voltage corresponding to the minimum change in compressor discharge pressure indicative of a compressor stall may be adjusted by the potentiometer 114. When the output signal from the integrator 98 integrates to a negative polarity sufficient to overcome the reference voltage from the potentiometer 114, the output signal from the pressure detector 106 switches to a high positive voltage. This output voltage, in turn, operates to fire the silicon controlled rectifier 126, thereby energizing the coil of relay 132.

Because the cathode of the silicon controlled rectifier 126 is at a voltage generally more negative than the output signal from the pressure detector 106, it becomes necessary to select a zener diode 124 with a sufficient voltage differential to allow the flow of current through the resistor 130 only when the output signal from the pressure detector 106 goes substantially above the zero baseline voltage. Once fired, the silicon controlled rectifier 126 continues to conduct current until it is manually interrupted by depressing the reset switch 136. In this manner, the relay 132 is latched into operation upon stall detection and remains in that state until manually released. It will also be readily apparent that the reset switch 136 could be replaced with an automatic delay circuit, not shown, which would reset the silicon controlled rectifier 126 at some prescribed time after initial stall detection.

The contacts 133 of relay 132 are connected in a parallel series arrangement and are normally closed when the coil of relay 132 is not energized. The power switch 138 may be closed manually to furnish power from the AC supply 140 to the solenoid 142 which may constitute an integral part of the valve 36. As is readily apparent, the valve 36 is normally open and permits the flow of fuel to the fuel nozzles 30 when the solenoid 142 is energized. The receipt of a stall signal, however, operates to trigger the silicon controlled rectifier 126, thus energizing the coil of relay 132 and opening the contacts 133 so as to de-energize the solenoid 142 and close the valve 36. The flow of fuel to the combustor 18 is thus interrupted upon the initiation of a compressor stall and will remain so until the reset switch is manually reset.

The test switch 79 may be used to check the stall protector of this invention upon the initial start-up of the gas turbine engine 10. By depressing the test switch 79, it is readily apparent that the reference voltage of the slope detector 78 may be substantially reduced below that value which would ordinarily be indicative of the maximum permissible rate of change of compressor discharge pressure during normal decelerations. Thus a pilot, after initially starting his engines and before taking off, may test the stall protector by first depressing the test switch 79 and then rapidly accelerating and decelerating the engine 10, whereupon the valve 36 should shut off, as would happen during a normal compressor stall. The pilot, after verifying that the stall protector is operating properly, must then release the test switch 79 before taking off, thus restoring the reference voltage of the slope detector 78 to its original level indicative of the maximum rate for normal deceleration of the engine.

Accordingly, while the preferred embodiment in a preferred application of the present invention has been depicted and described, it will be appreciated by those skilled in the art that many modifications, substitutions and changes may be made thereto without departing from the invention's fundamental theme. For example, although the stall protector of this invention has been described in conjunction with a gas turbine engine as utilized on an aircraft, it could also be applied to the same type of gas turbine engine as used in other applications, such as shipboard propulsion or pipeline pumping. It will also be understood that although a gas turbine engine of the straight turbojet type has been described and depicted, other types of gas turbine engines such as a turboshaft or turbofan engine may also be utilized in conjunction with the stall protector of this invention. It should be further appreciated that, although separate amplifier circuits 56, 68 have been shown, it may be possible to entirely eliminate these amplifier circuits depending upon the gain of the pressure transducer which is selected.

Therefore, having described the preferred embodiments of the invention, what is desired to be secured by Letters Patent is as follows:

We claim:

1. A stall protector system for a gas turbine engine of the type having a compressor, combustor, turbine and exhaust duct in serial flow relation comprises:
   means for measuring compressor pressure and providing an electrical output signal corresponding to the actual compressor pressure measured;
   a differentiator for differentiating the output signal from the measuring means and providing an output signal indicative of the rate of change of compressor pressure;
   a slope detector for comparing the rate of change of compressor pressure with a reference rate signal indicative of the maximum rate at which the compressor pressure may be expected to decrease during normal operation;
   an integrator for providing a time integration of the compressor pressure rate when the actual rate of decrease of compressor pressure exceeds the reference rate;
   a pressure detector for comparing the actual change in compressor pressure from the integrator with a second reference signal corresponding to the minimum change in compressor pressure indicative of a compressor stall;
   and means for regulating the flow of fuel to the combustor when the actual change in compressor pressure exceeds the second reference signal.

2. The stall protector system of claim 1 wherein the means for regulating the flow of fuel to the combustor includes:
   a silicon controlled rectifier connected to fire upon receipt of a signal from the pressure detector indicative of an actual change in compressor pressure which exceeds the second reference signal;
   a relay in series connection with the silicon controlled rectifier so as to be energized upon firing of the silicon controlled rectifier wherein the relay includes at least one contact which opens upon energization of the relay;
   and a solenoid controlled valve for interrupting the flow of fuel to the combustor upon opening of the relay contacts.

3. The stall protector of claim 2 wherein:
   there is further included a diode, a zener diode, and a resistor in series connection between the pressure detector and the gate of the silicon controlled rectifier, together with a second resistor interconnecting the gate and cathode of the silicon controlled rectifier, wherein the zener diode has a sufficient voltage differential to allow the flow of current through the second resistor only when the output signal from the pressure detector goes substantially above zero volts.

4. The stall protector of claim 1 wherein:
   the slope detector includes an operational amplifier, one input of which is serially connected to receive the output from the differentiator through a series resistor with the other input connected to receive the first reference rate signal through a second series resistor from a reference network of resistors connected between a voltage supply wherein the output of the operational amplifier is directed through a third series resistor and a series diode with the anode side of the diode connecting back to the input of the slope detector through a parallel resistor, and
   the integrator includes a second operational amplifier in parallel connection with a feedback diode and a feedback capacitor such that if the rate of decrease of the compressor pressure is less than the reference rate signal, the output signal from the slope detector will assume a negative polarity and the output signal from the integrator will remain latched at a predetermined voltage through the first diode and feedback diode, while if the rate of decrease of compressor pressure exceeds the reference rate signal then the output signal from the slope detector will switch to a positive polarity causing the second operational amplifier to integrate in a given direction wherein the actual rate of integration is determined by the feedback capacitor and parallel resistor together with the magnitude of the output signal from the differentiator.

5. The stall protection system of claim 4 including:
   an amplifier and inverter circuit in series connection between the differentiator and slope detector wherein the amplifier and inverter circuit include a third operational amplifier together with a feedback resistor and a second feedback capacitor connected in parallel arrangement, with one input to the third operational amplifier connected to zero volts through a fourth series resistor; and
   an amplifier in series connection between the pressure measuring means and differentiator wherein the second amplifier includes a fourth operational amplifier, together with a second feedback resistor; and a fifth series resistor in serial connection between the amplifier and differentiator.

6. The stall protector of claim 5 wherein: the differentiator includes a capacitor, and the first feedback resistor and second feedback capacitor operate in conjunction with the fifth series resistor and differentiator capacitor to provide a double lag break filter at approximately 190 radians.

7. The stall protector of claim 1 wherein the pressure detector includes:
   an operational amplifier, one input of which is connected to receive the output from the integrator through a series resistor together with the second reference signal through a second series resistor from a reference network of resistors connected between a voltage supply wherein the output from the pressure detector is directed to the gate of a silicon controlled rectifier within the fuel flow regulating means.

8. A stall protector system for a gas turbine engine of the type having a compressor, combustor, turbine and exhaust duct in serial flow relation comprises:
   a pressure transducer for measuring compressor discharge pressure and providing an electrical output signal correlating to the actual compressor discharge pressure measured;
   a differentiator including a capacitor for differentiating the output signal from the pressure transducer and providing an output signal indicative of the rate of change of compressor pressure;
   a slope detector having an operational amplifier, one input of which receives the output from the differentiator for comparison with a reference rate signal applied to the other input wherein the reference rate signal is indicative of the maximum rate at which the compressor discharge pressure may be expected to decrease during deceleration and the output of the operational amplifier is directed through a series diode, the anode side of which connects back to the input of the slope detector through a parallel resistor;

an integrator having a second operational amplifier in parallel connection with a feedback diode and a feedback capacitor such that if the rate of decrease of compressor discharge pressure is less than the reference rate signal, the output from the slope detector remains at a predetermined polarity latching the output signal of the integrator through the series diode and feedback diode, while if the rate of decrease of compressor discharge pressure exceeds the reference rate signal, then the output signal from the slope detector will switch to an opposite polarity, causing the second operational amplifier to integrate in a given direction;

a pressure detector having a third operational amplifier, one input of which is connected to receive the output from the integrator together with a second reference signal corresponding to the minimum change in compressor discharge pressure indicative of a compressor stall such that when the output from the integrator exceeds the second reference signal, there is a switch in the polarity of the output signal from the pressure detector;

and means for regulating the flow of fuel to the combustor when there is a switch in the polarity of the output signal from the pressure detector due to the output from the integrator exceeding the second reference signal.

9. The stall protector system of claim 8 wherein the means for regulating the flow of fuel to the combustor includes:

a silicon controlled rectifier connected to fire upon an increase in the level of the output signal from the pressure detector; and a relay in series connection with the silicon controlled rectifier so as to be energized upon firing of the silicon controlled rectifier wherein the relay includes at least one contact which switches upon energization of the relay for controlling a valve which regulates the flow of fuel to the combustor.

10. The stall protector system of claim 9 including:

an amplifier and inverter circuit in series connection between the differentiator and slope detector wherein the amplifier and inverter circuit include a fourth operational amplifier together with a feedback resistor and a second feedback capacitor connected in parallel arrangement, and an amplifier in series connection between the pressure transducer and differentiator wherein the second amplifier includes a fifth operational amplifier together with a third feedback capacitor.

* * * * *